United States Patent [19]

Lin

[11] Patent Number: 4,856,953

[45] Date of Patent: Aug. 15, 1989

[54] HOOK-DRIVEN SCREW WITH REPLACEABLE HOOK

[76] Inventor: Ming-Tang Lin, P. O. Box 10160, Taipei, Taiwan

[21] Appl. No.: 213,128

[22] Filed: Jun. 29, 1988

[51] Int. Cl.⁴ .................. F16B 15/02; F16B 23/00
[52] U.S. Cl. ............................... 411/383; 411/400; 411/407; 248/217.4
[58] Field of Search ............ 411/400, 401, 383, 396, 411/403, 404, 407, 349, 553; 81/460, 461; 248/216.1, 217.4, 224.3, 224.4, 225.2

[56] References Cited

U.S. PATENT DOCUMENTS

| | | | |
|---|---|---|---|
| 633,909 | 9/1899 | Sanford | 248/217.4 |
| 1,365,508 | 1/1921 | Kucewicz | 411/400 |
| 1,874,657 | 8/1932 | Trotter | 81/460 |
| 2,777,353 | 1/1957 | Willis | 411/403 |

Primary Examiner—Neill R. Wilson

[57] ABSTRACT

A combination of a screw with a hook includes a screw fixed on a wall having a pair of longitudinal grooves formed in a cylindrical hole in the screw, and a hook having a cylindrical shank with a pair of longitudinal extensions engageable with the two longitudinal grooves in the screw, so that a hook inserted in the screw may be replaced with another new hook or different shaped hook.

1 Claim, 2 Drawing Sheets

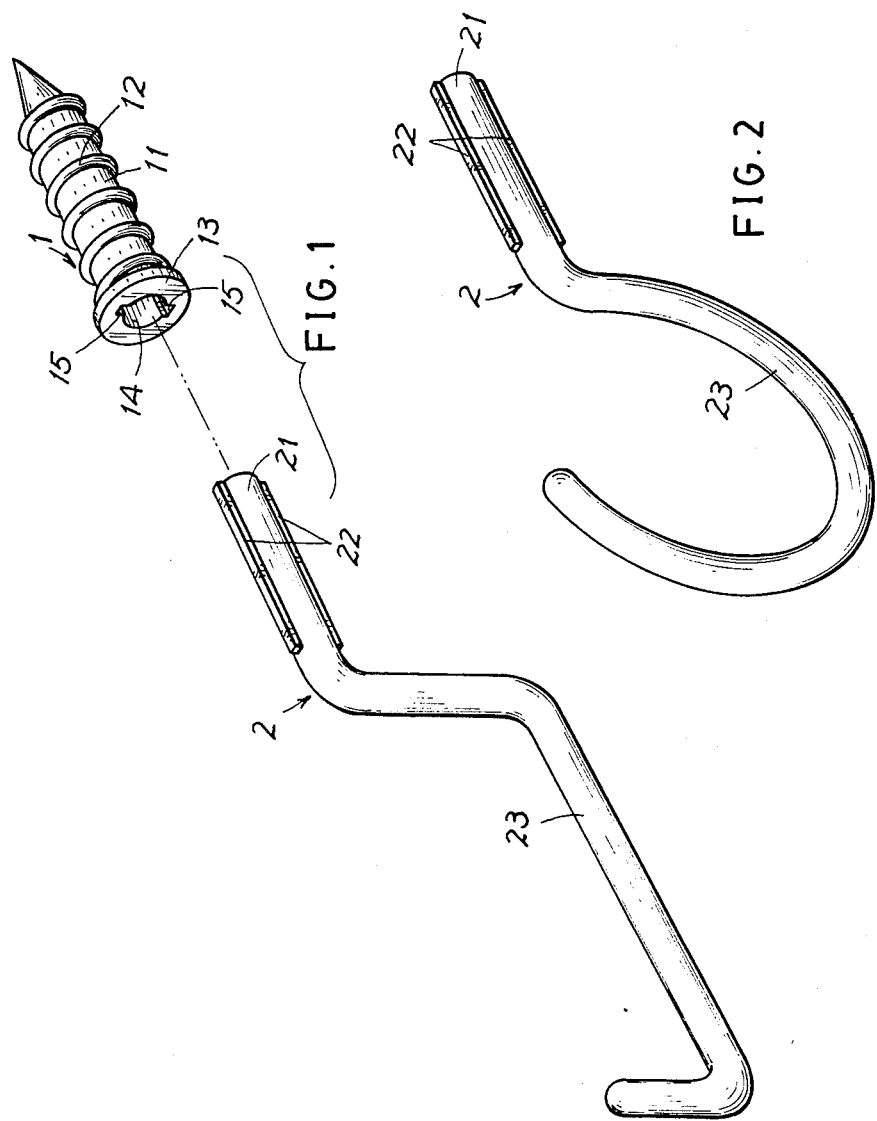

HOOK-DRIVEN SCREW WITH REPLACEABLE HOOK

BACKGROUND OF THE INVENTION

Smith & Davis Limited disclosed an improvement in suspension hooks or the like in their U.K. Pat. No. 302,565, comprising a metal plate or bracket having one or more inclined sockets for receiving a securing pin in which a pin head 7 may serve as a hook or a further hook 11 is severed from the bracket for hanging article on the hook 7 or 11. However, such an U.K. Patent has the following drawbacks:

1. If the pin head 7 is directly served as a hook, the hook is too "shallow" to stably hang an article thereon.

2. If the hook 11 directly severed or stamped on the bracket as shown in their FIG. 4 is adapted for hanging a bigger article, the article may be easily released or slipped from the hook. If the hook 11 is inferentially made to be very large for hanging bigger article, the strength of the severed hook 11 would be doubtful as subject to a heavy load by the hanged article.

3. The article as hanged on the hook 11 disposed between the two struts 8 may be obstructed or influenced by the struts of the bracket.

The present inventor has found the drawbacks of such a conventional U.K. Patent and invented the present screw with replaceable hook.

SUMMARY OF THE INVENTION

The object of the present invention is to provide a combination of a screw with a replaceable hook wherein the screw is formed a cylindrical hole therein engageable with a shank of the hook having a pair of longitudinal grooves longitudinally recessed in the cylindrical hole and the hook is formed with a pair of longitudinal extensions longitudinally disposed on a cylindrical shank of the hook engageable with the longitudinal grooves in the screw, so that upon a rotation of the hook engaged with the screw, the screw may be fixed in a wooden wall, and the hook may also be withdrawn from the screw for replacing another differently shaped hook.

BRIEF DESCRIPTION OF THE DRAWINGS

FIG. 1 is a perspective illustration of the present invention.

FIG. 2 shows another shape of a hook of the present invention.

DETAILED DESCRIPTION

Figure 3:
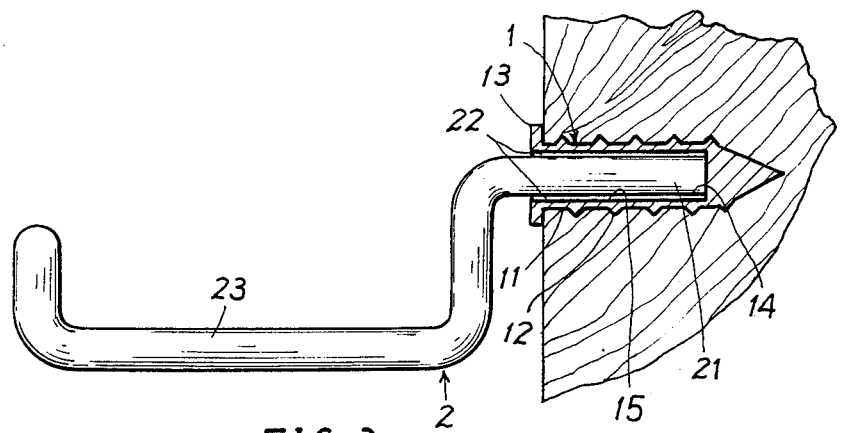
FIG. 3 is an illustration of the present invention as assembled and fixed in a wall.

As shown in FIGS. 1-3, the present invention comprises: a screw means 1 adapted to be fixed in a wall, and a hook means 2 replaceably mounted in the screw means 1.

The screw means 1 includes: a screw shank 11 having spiral threads 12 formed thereon, a flange 13 secured to a head portion of the shank 11, a cylindrical hole 14 formed in the screw means 1 through the flange 13, and a pair of longitudinal grooves 15 longitudinally recessed in a cylindrical wall of the cylindrical hole 14.

The hook means 2 includes: a cylindrical hook shank 21 engageable with the cylindrical hole of the screw means 1, a pair of longitudinal extensions 22 longitudinally formed on the hook shank 21 engageable with the pair of longitudinal grooves 15 in the screw means 1, and a hook portion 23 protruding outwardly from the hook shank 21. The hook portion 23 may be formed as an U shape as shown in FIG. 1 or formed as a C shape as shown in FIG. 2 or other shapes. The length of extension 22 is equal to a length of the groove 15.

When using the present invention, the cylindrical shank 21 of the hook means 2 is inserted into the hole 14 of the screw means 1 having the extensions 22 of the hook means 2 engaged with the grooves 15 of the screw means 1 and the hook portion 23 serving as a handle is rotated to advance the screw means 1 into a wooden wall or other walls as shown in FIG. 3. The hook portion 23 will then serve to hang an article thereon.

Figure 4:
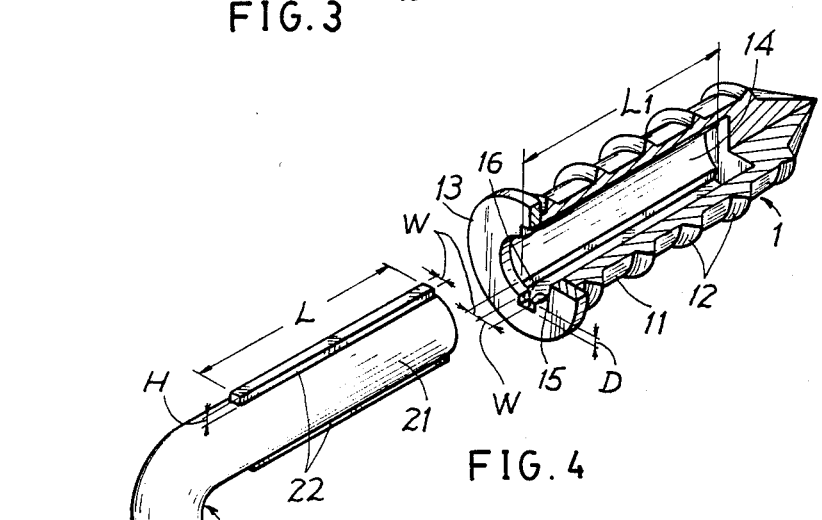
FIG. 4 is an illustration showing another preferred embodiment of the present invention.
Figure 5:
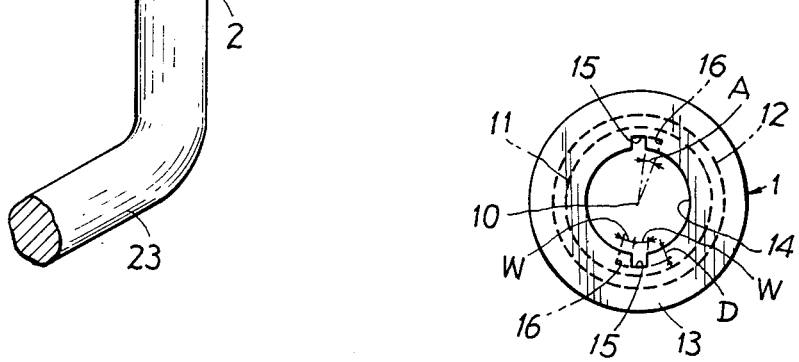
FIG. 5 is a front view of the screw as shown in FIG. 4.

Another preferred embodiment of the present invention is shown in FIGS. 4 and 5, wherein the flange 13 of the screw means 1 is formed a pair of first longitudinal grooves 15 engageable with a pair of longitudinal extensions 22 formed on the hook means 2. However, a pair of second longitudinal grooves 16 are longitudinally recessed in a cylindrical wall of the cylindrical hole 14 in the screw shank 11 of the screw means 1, each groove 16 in the shank 11 being enlarged clockwise along a circumferential surface of a cylindrical wall confined by the cylindrical hole 14 from the groove 15 in the flange 13. The depth D of either groove 15 formed in the flange 13 or groove 16 formed in the shank 11 is equal to a height H of the extension 22 formed on the hook shank 21. The width W of the groove 15 in the flange 13 is equal to a width W of the extension 22. The width of the groove 16 in the shank 11 should be at least two times (2W) of that (W) of the groove 15 or extension 22. The length L1 of the second groove 16 should be equal or slightly larger than the length L of the extension 22.

After inserting the hook shank 21 into the screw hole 14, the hook portion 23 serving as a handle is rotated to drive the screw means 1 to be fixed into a wall. During a clockwise rotation of the hook means 2, the extensions 22 will be biased to projectively deviate from the first groove 15 of the flange 13 at a central angle A around a longitudinal axis 10 of the screw 1 as shown in FIG. 5, thereby being limited by the flange 13 and unable to be withdrawn from the hole 14 for a stable hanging of an article on the hook portion 13.

The screw means 1 of the present invention can be modified as a nail (not shown) which can be fixed into a concrete wall and then the hook means 2 is inserted into the screw hole 14 for hanging purpose.

The present invention is superior to a conventional hook or screw with the following advantages:

1. The hook 2 can be optionally replaceable for quicker maintenance work or for diversified choices of hanging uses.

2. The hook portion 23 can serve in situ as a handle when driven to advance the screw means 1 into a wall.

3. The construction and installation of the hook and screw device is so simple for better usages thereof.

I claim:

1. A hook-driven screw means comprising:
   a screw means adapted to be fixed in a wall having a screw shank formed with a flange secured on a head portion of the screw shank, and having a cylindrical hole longitudinally formed in the screw means through said flange; and a hook means having a cylindrical hook shank engageable with said cylindrical hole in said screw means, and a hook portion protruding outwardly from said hook shank for hanging an article thereon;

the improvement which comprises:

said flange of said screw means formed with a pair of first longitudinal grooves longitudinally recessed in the cylindrical hole formed in said flange;

said screw shank formed with a pair of second longitudinal grooves longitudinally recessed in said cylindrical hole in said screw shank, said second longitudinal groove longitudinally communicated with said first longitudinal groove and enlarged clockwise along a circumferential surface of a cylindrical wall confined by the cylindrical hole in said screw shank to have a width twice of a width of said first longitudinal groove in said flange;

said hook shank having a pair of longitudinal extensions longitudinally formed thereon, each said extension having a width and a height respectively equal to a width and a depth of said first longitudinal groove;

said second longitudinal groove having a depth equal to the height of said longitudinal extension and having a width twice of the width of said longitudinal extension of said hook shank, whereby upon a rotation of said hook means when the hook shank is engaged in the screw shank to rotatively bias each said extension in said second longitudinal groove to projectively deviate from said first longitudinal groove at a central angle around a longitudinal axis of said screw means, each said extension of said hook means is limited by said flange, unable to be withdrawn from said screw means.

* * * * *